(12) United States Patent
Brabenac

(10) Patent No.: US 6,523,126 B1
(45) Date of Patent: Feb. 18, 2003

(54) WATCHDOG TIMER THAT IS DISABLED UPON RECEIVING SLEEP STATUS SIGNAL FROM MONITORED DEVICE WHEREIN MONITORED DEVICE IS NOT RESPONSIVE TO TIME-OUT OF WATCHDOG TIMER

(75) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/420,095

(22) Filed: Oct. 18, 1999

(51) Int. Cl.$^7$ .................................................. G06F 1/26
(52) U.S. Cl. ...................... 713/323; 340/3.1; 714/51; 725/111
(58) Field of Search ........................... 340/3.1; 725/111; 713/323; 714/51, 55

(56) References Cited

U.S. PATENT DOCUMENTS

| | | | | |
|---|---|---|---|---|
| 3,795,800 A | * | 3/1974 | Nimmo et al. ................. | 714/23 |
| 5,155,846 A | * | 10/1992 | Mino ........................... | 714/55 |
| 5,175,845 A | * | 12/1992 | Little ........................... | 713/321 |
| 5,438,614 A | * | 8/1995 | Rozman et al. ........... | 379/93.08 |
| 5,649,098 A | * | 7/1997 | Shieh et al. .................... | 714/55 |

OTHER PUBLICATIONS

"Watchdog Timer in Power–Management System", IBM Technical Disclosure Bulletin, vol. 41 No. 01 p. 737, Jan. 1998.*

"Direct Attached Local Area Network Adaptor with Power Conservation Capabilities", IBM Technical Disclosure Bulletin, vol. 40 No. 10 pp. 43–45, Oct. 1997.*

Microchip Technology, Inc., PICmicro Mid–Range MCU Family Reference Manual, Section 26 [online], 1997 [retrieved on Apr. 23, 2002]. Retrieved from the Internet:<www.microchip.com/download/lit/suppdoc/refernce/midrange/midsect/31026a.pdf>.*

* cited by examiner

Primary Examiner—Thomas Lee
Assistant Examiner—Albert Wang
(74) Attorney, Agent, or Firm—Schwegman, Lundberg, Woessner & Kluth, P.A.

(57) ABSTRACT

A system comprises a first device and a second device. The first device operates in a power management environment and has a sleep status signal for indicating a sleep status to the second device. The sleep status indicates if the first device is in a sleep state or normal operation state. The second device is coupled to the first device and checks for malfunctions of the first device. The second device only checks for malfunctions of the first device if the first device is in the normal operation state.

21 Claims, 4 Drawing Sheets

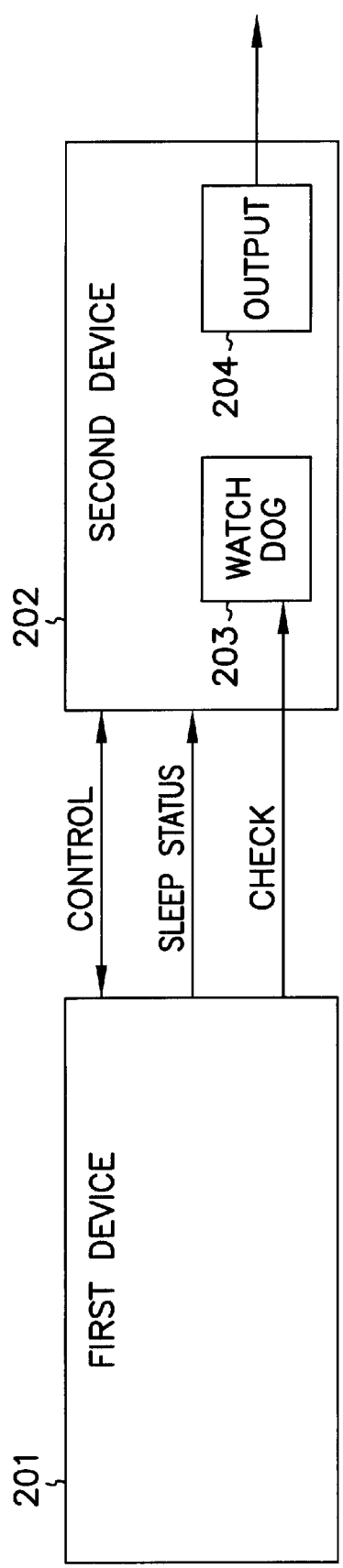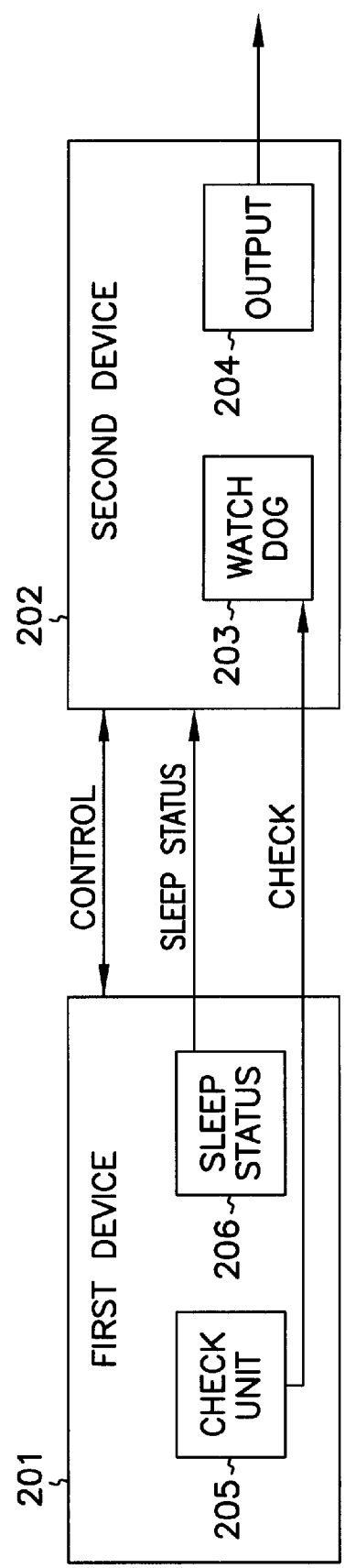
FIG. 2A
FIG. 2B

WATCHDOG TIMER THAT IS DISABLED UPON RECEIVING SLEEP STATUS SIGNAL FROM MONITORED DEVICE WHEREIN MONITORED DEVICE IS NOT RESPONSIVE TO TIME-OUT OF WATCHDOG TIMER

FIELD OF THE INVENTION

This invention relates generally to power management, and more particularly to controlling malfunctions with power management.

BACKGROUND

The power consumption of electronic devices is important. The more power that an electronic device uses corresponds to a number of problems such as increased energy costs and increased heat. Furthermore, many devices utilize battery backups in case of power outages. If devices use too much power, these battery backups are of little value. Also, energy conservation saves money and conserves natural resources.

Electronic devices are often designed to reduce the power consumption. For example, operating voltages of some computer systems have moved from five volts to three volts in order to reduce power. However, power reduction of electronic devices can only be reduced so far by designing.

One way electronic devices can reduce power is by utilizing a power management environment. By utilizing a power management environment, electronic devices and systems may be placed into an energy conserving "sleep" state. In this sleep state, parts or components of the system may shut down or operate at a low capacity. This permits energy saving by powering down these devices while they are not being used. The sleep state is different than simply shutting down a device. An electronic device may "wake up" from a sleep state and continue operation as before the device entered the sleep state.

Power management environments are often used in customer premise equipment (CPE) such as personal computers, workstations, network computers, and other electronic equipment. Personal computers can enter a "sleep" state after some amount of time of inactivity. In this sleep state, devices such as monitors, hard drives, modems, video cards and tape drives may shut down thus conserving energy. The processor may shut down or operate at a fraction of normal speed also conserving energy. Personal computers can "wake up" from this sleep state by events such as mouse movement, keyboard being used and a network message.

Electronic devices often interact with each other. Naturally, it is hoped that errors do not occur but if errors or malfunctions do occur, something needs to be done to prevent further errors. Many of today's electronic devices implement a "watchdog timer" function to control and prevent proliferation of errors. This function assures that if a device's software or another device controlling it malfunction, steps are taken to either return the device back to an operating state (i.e., reset it) or disable it from behaving in an undesired manner until the problem is corrected. Devices utilizing a watchdog timer expect to receive some type of signal from another device at a regular interval. This "signal" resets the watchdog timer. If the watchdog timer is not reset, the device utilizing the watchdog timer can assume that an error has occurred and take appropriate steps.

When watchdog systems are used in conjunction with power management environments, additional problems can occur when devices enter a sleep state. When a device enters a sleep state, it is no longer able to communicate with another device and reset the watchdog timer in the watchdog system. Thus, devices may consider a device in a sleep state to be non-functioning. For example, consider a personal computer operating with a cable modem using a watchdog system in a power management environment. If the personal computer enters a sleep state it can no longer reset or clear the watchdog timer. The cable modem assumes that the personal computer is malfunctioning and disables its output. Then, when the computer exits the sleep state the computer has to reestablish its connection to the network which may involve resetting the cable modem. This can result in missing an incoming message.

One solution to this problem is to have a multiple device system and not use a watchdog timer. There is no longer concern over one device shutting down or disabling when another device enters a "sleep" state. However, this too is undesirable because errors can then proliferate. For example, consider a personal computer operating with a cable modem in a power management environment without using a watchdog system. If the personal computer malfunctions and the error is not caught, the cable modem could corrupt other users' information on the cable system.

For the reasons stated above, and for other reasons stated below which will become apparent to those skilled in the art upon reading and understanding the present specification, there is a need in the art for a watchdog system in a power management environment.

SUMMARY

One embodiment of the invention is a system comprising a first device and a second device. The first device operates in a power management environment and has a sleep status signal for indicating a sleep status to the second device. The second device is coupled to the first device and checks for malfunctions of the first device.

Another embodiment of the invention is a system comprising a plurality of customer premise equipment (CPE) devices, a plurality of cable modems, and a cable modem network. The plurality of CPE devices operate in a power management environment. The plurality of cable modems are coupled to the plurality of CPE devices and the cable modem network for providing network access to the plurality of CPE devices.

Other embodiments of systems and methods are disclosed.

BRIEF DESCRIPTION OF THE DRAWINGS

FIG. 2A is a block diagram of a power management watchdog system in accordance with an embodiment of the present invention.

FIG. 2B is a block diagram of a power management watchdog system in accordance with an embodiment of the present invention.

DETAILED DESCRIPTION

Figure 1:
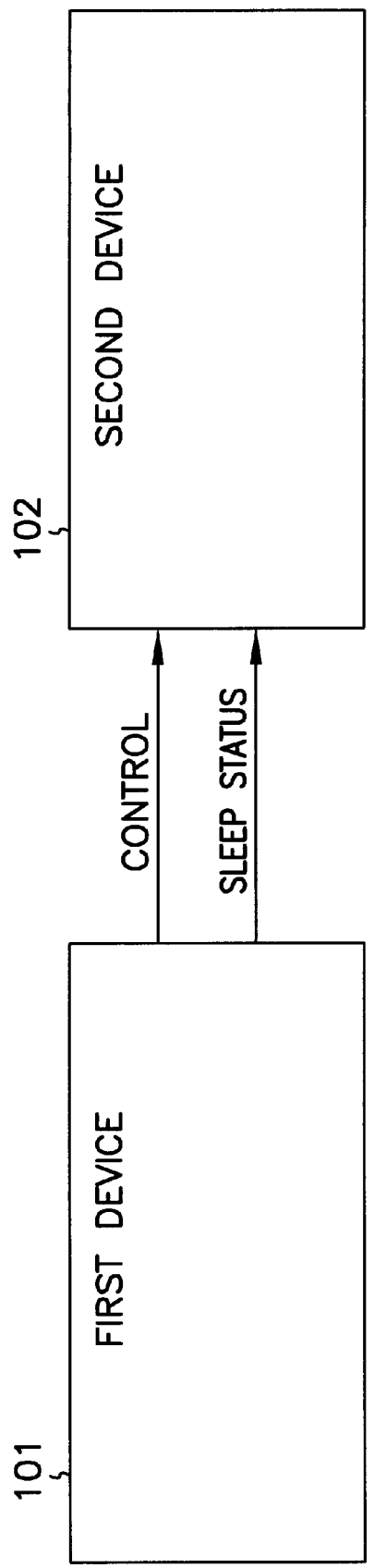
FIG. 1 is a block diagram of a power management system in accordance with an embodiment of the present invention.

The following discussion sets forth numerous specific details to provide a thorough understanding of the invention.

However, those of ordinary skill in the art, having benefit of this disclosure, will appreciate that the invention may be practiced without these specific details. In addition, various well known methods, procedures, components, and circuits have not been described in detail in order to focus attention on the features of the present invention.

Electronic devices of today utilize power management for energy conservation and watchdog systems to detect malfunctions and reduce proliferation of errors from those malfunctions. However, combining the power management and watchdog systems can create problems.

A watchdog system operates with two devices. Watchdog systems are generally used when one device relies on another for operating correctly and attempts to catch malfunctions of the other device.

One area that typically uses watchdog systems are cable modem network systems. A cable modem network includes a number of cable modems that share one physical network. Cable modems reside on a medium where all users share the same headend modem, bandwidth and access to highly valued content. Since the cable modems share the one network, it is especially important that one cable modem does not interfere with other cable modems. Typically, the number of cable modems share the network by time slicing which means that each modem is assigned a "time" in which to operate or send data and in which no other cable modem is to operate or send data. For cable modems, each device talks in turn. Ever device or user is given or assigned a particular length of time and a time to send or transmit data. If one user keeps sending data, other users can not access the network. Thus, if one cable modem malfunctions it can corrupt data for other users or prevent other users from using the network.

The majority of cable modems are stand alone units that have their own processor, software stack, and memory footprint. These stand alone units operate independently of customer premise equipment (CPE). Thus, an error in customer premise equipment does not result in interference with the cable network or other cable modems. However, a number of cable modems are operated by the CPE and are called CPE based cable modems. These CPE based cable modems do not have their own processor, software stack, and memory footprint. The CPE based cable modems rely on the CPE to operate them. Since the CPE based cable modems rely on the CPE, they can be more prone to errors. For example, if the CPE is a personal computer and the computer crashes, the CPE based cable modem could be locked in a state where it is transmitting data continuously and is thus preventing other users from using the network. Or, the personal computer could malfunction and transmit financial data that the user does not want transmitted. Therefore, CPE based cable modems should have some way to catch malfunctions in CPE devices.

The CPE based cable modems can incorporate a watchdog timer to detect malfunctions in customer premise equipment. The CPE periodically sends a signal or notification to the CPE based cable modem that it is operating normally. If the periodic signal is not received, the CPE based cable modem assumes that the CPE has malfunctioned and disables its output so that the cable network is not interfered with.

However, many CPE devices such as personal computers operate in a power management environment. In the power management environment, the CPE enters a sleep state after a certain period of inactivity. While in the sleep state, the CPE can no longer periodically signal or notify the CPE based modem that it is operating normally. Thus, the CPE based cable modem will incorrectly think there is a malfunction and disable its output. Then, when the CPE "wakes up" from its sleep state, it finds the CPE based cable modem disabled. To avoid this, the CPE sends a signal to the CPE based cable modem when it is entering a sleep state so that the CPE device does not incorrectly find that the CPE device has malfunctioned. The CPE based cable modem can disable the watchdog timer or continuously reset the timer or just ignore the timer until the CPE has signaled the CPE based cable modem that it has "woken up". Furthermore, the CPE based cable modem can cause the CPE to "wake up" by signaling it to do so. The CPE based cable modem may do so upon receiving a network message.

A large number of devices besides cable modems can be used with devices such as CPE in this manner. Some examples of the large number of devices are modems, network cards, external drives, and printers. A modem can include but is not limited to types of modems such as cable modems, digital subscriber line modems, 28 k modems, and 56 k modems.

FIG. 1 shows one embodiment of a power management system. The system includes a first device 101 and a second device 102. The first device 101 can be any electronic device such as a personal computer. The second device 102 is connected to the first device 101. The connection may be through a system bus, serial port, parallel port or universal serial bus (USB). The second device 102 can be any electronic device such as a modem or network device. Typically, the second device 102 is controlled or operated by the first device.

The first device 101 operates in a power management environment. The first device 101 signals or informs the second device 102 if it has entered a sleep state. The second device 102 continuously or periodically checks to see if the first device 101 is operating normally. If the second device 102 determines that the first device 101 has malfunctioned, the second device follows a malfunction procedure to prevent further proliferation of errors. The malfunction procedure may be something as simple as shutting down or disabling itself. When the first device 101 has informed the second device 102 of it entering the sleep state, the second device 102 no longer attempts to detect a malfunction of the first device 101. The first device 101 signals or informs the second device 102 upon exiting the sleep state or waking up and resuming normal operation. On waking up, the first device 101 is able to continue operating as if it had never entered the sleep state. The second device 102 resumes its normal operation and continuously or periodically determines if the first device has malfunctioned.

FIG. 2A shows one embodiment of a power management watchdog system. The system includes a first device 201 and a second device 202. The first device 201 can be any customer premise equipment (CPE) device such as a personal computer. The second device 202 is connected to and controlled by the first device 201. The connection may be through a system bus, serial port, parallel port, universal serial bus (USB), or other communication channel or bus. The second device 202 can be any electronic device such as a digital subscriber line (DSL) modem, cable modem or network card.

The second device 202 includes a watchdog function 203 and an output unit 204. The second device 202 can communicate with other devices. The watchdog function 203 checks for a malfunction of the first device 201 by utilizing a timer. Once enabled, the timer starts counting. The counter must be reset periodically by a check signal or a command that resets the timer. A command can be sent to reset the timer through an interface such as a universal serial bus or a control wire may be used with a logical output for the sleep state. If the timer reaches a predetermined value, the second device 202 assumes that the first device 201 has malfunctioned. On a malfunction, the second device 202 disables its output unit 204 so that a proliferation of errors is prevented. The output unit 204 can be a line, a function, or a signal. For example, a cable modem disables its output so that a malfunctioning personal computer does not send erroneous data or disrupt a network.

If the first device 201 enters a sleep state, it sends a signal or informs the second device 202 of entering the sleep state. The second device 202 now knows not to check for malfunctions of the first device 201. This can be done a number of ways such as by disabling the watchdog timer, periodically resetting the timer, or ignoring the watchdog function 203. Thus, the second device 202 does not disable its output when the first device 201 enters the sleep state. This permits the second device 202 to continue operating. In an alternate embodiment, the second device 202 can "wake up" the first device 201 or cause the first device 201 to exit the sleep state by sending a signal or a command from the second device 202 to the first device 201.

FIG. 2B is one embodiment of a power management system according to the present invention. The system includes a first device 201 and a second device 202. The first device 201 includes a check unit 205 and a sleep status 206. The second device 202 includes a watchdog function 203 and an output unit 204.

The first device 201 operates in a power management environment. The first device 201 can be any customer premise equipment (CPE) device such as a personal computer. The first device 201 includes a check unit 205. The check unit 205 is for periodically signaling that the first device 201 is operating normally. This signal is sent to the second device 202 or the watchdog function 203 of the second device. The signal can be sent to any number of devices for showing that the first device 201 is operating normally. The first device 201 includes a sleep status unit 206. The sleep status unit 206 is for signaling that the first device 201 is or has entered a sleep state. The sleep state is a power conserving state. The signal is sent to the second device 202 or the watchdog function 203 of the second device. The signal can be sent to any number of devices for showing that the first device 201 is in a sleep state.

The second device 202 is connected to the first device 201. The second device 202 may be controlled or operated by the first device 201. For example, the second device could be a modem that is controlled by a personal computer. The second device 202 can be connected to the first device 201 by any means such as a network or interface. In other embodiments, a number of second devices can be connected to one first device or a number of first devices can be connected to one second device.

The second device 202 includes a watchdog function 203 and an output unit 204. The second device 202 can communicate with other devices. The watchdog function 203 checks for a malfunction of the first device 201 by utilizing a timer. Once enabled, the timer starts counting. The counter must be reset periodically by a check signal or a command that resets the timer. A command can be sent to reset the timer through an interface such as a universal serial bus or a control wire may be used with a logical output for the sleep state. If the timer reaches a predetermined value, the second device 202 assumes that the first device 201 has malfunctioned. On a malfunction, the second device 202 disables its output unit 204 so that a proliferation of errors is prevented. The output unit 204 can be a line, a function, or a signal.

Figure 3:
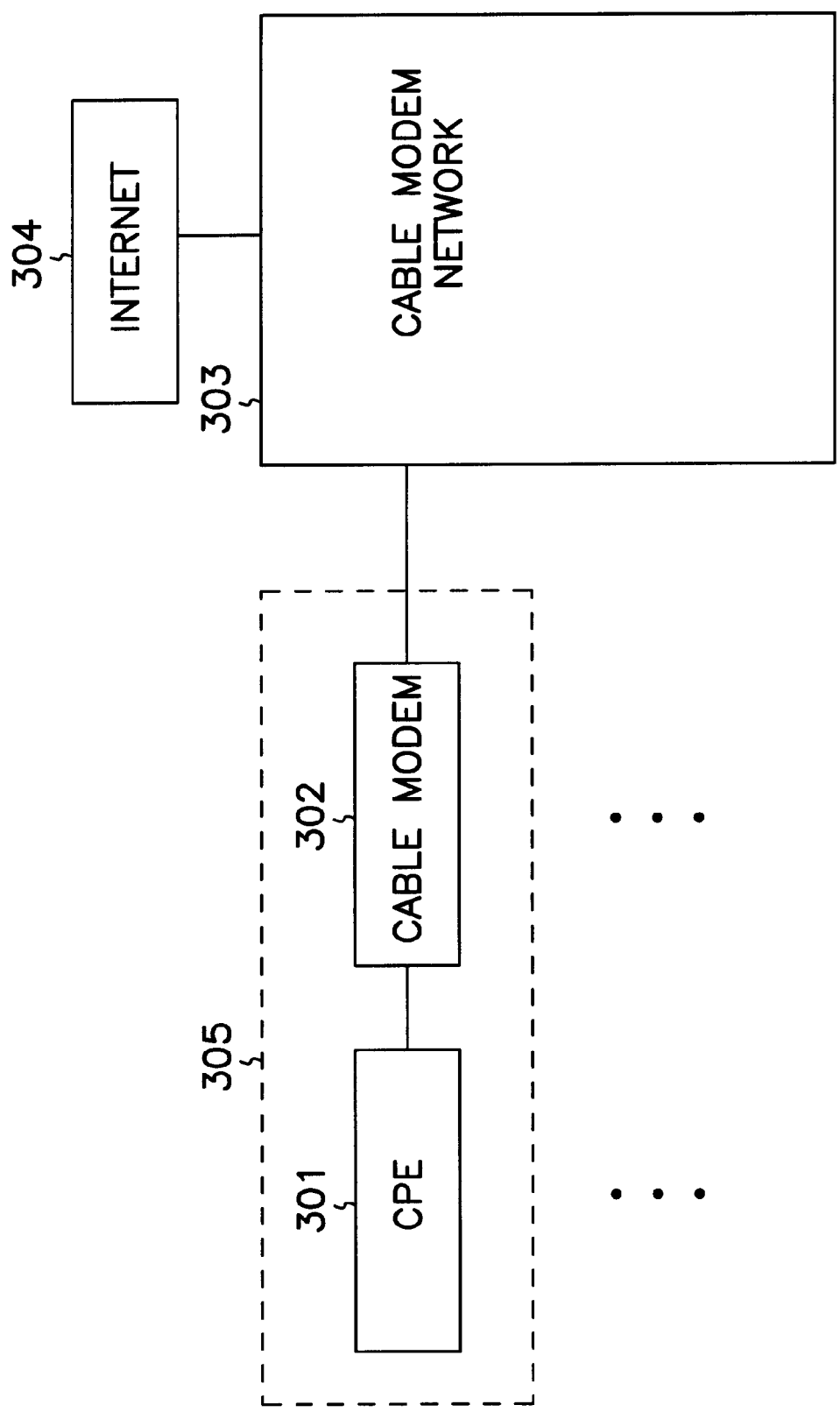
FIG. 3 is a block diagram of a system in accordance with an embodiment of the present invention.

FIG. 3 is a system according to one embodiment of the invention. The system includes a plurality of customer premise equipment (CPE) devices 301, a plurality of cable modems 302, and a cable modem network 303.

The plurality of CPE devices 301 can be personal computers. The plurality of cable modems 302 are CPE based cable modems. Unlike stand alone cable modems which have a processor, software stack and a memory footprint, CPE based cable modems are operated and controlled by CPE devices. The plurality of cable modems 302 are connected and controlled by the plurality of CPE devices 301. Each cable modem is connected to one computer and is generally used for providing network access to the CPE device.

The plurality of cable modems 302 each contain a watchdog function and an output. The watchdog function checks for malfunctions by the corresponding CPE device. The output is connected to the cable modem network 303. The watchdog function includes a timer and, once enabled, the timer starts counting. The counter must be reset periodically by a check signal or a command that resets the timer and is sent from the CPE device. A command can be sent to reset the timer through an interface such as a universal serial bus or a control wire may be used with a logical output for the sleep state. If the timer reaches a predetermined value, the cable modem assumes that the CPE device has malfunctioned. On a malfunction, the cable modem disables its output so that a proliferation of errors is prevented.

If one of the plurality of CPE devices 301 enters a sleep state, it sends a signal or informs the corresponding cable modem of entering the sleep state. The cable modem now knows not to check for malfunctions of the CPE device. This can be done a number of ways such as by disabling the watchdog timer, periodically resetting the timer, or ignoring the watchdog function. Thus, the cable modem does not disable its output when the customer premise equipment device enters the sleep state. This permits the cable modem to continue operating. The cable modem may finish sending data or receive data even though the CPE device has entered a sleep state. The cable modem can "wake up" the CPE device to exit the sleep state by sending a signal or a command from the cable modem to the CPE device. The command may be sent across an interface such as a multiplexed interface like USB. The CPE device sends another signal or command when it has exited the sleep state and resumed normal operation. The cable modem then resumes using the watchdog timer to check for malfunctions of the CPE device.

Figure 4:
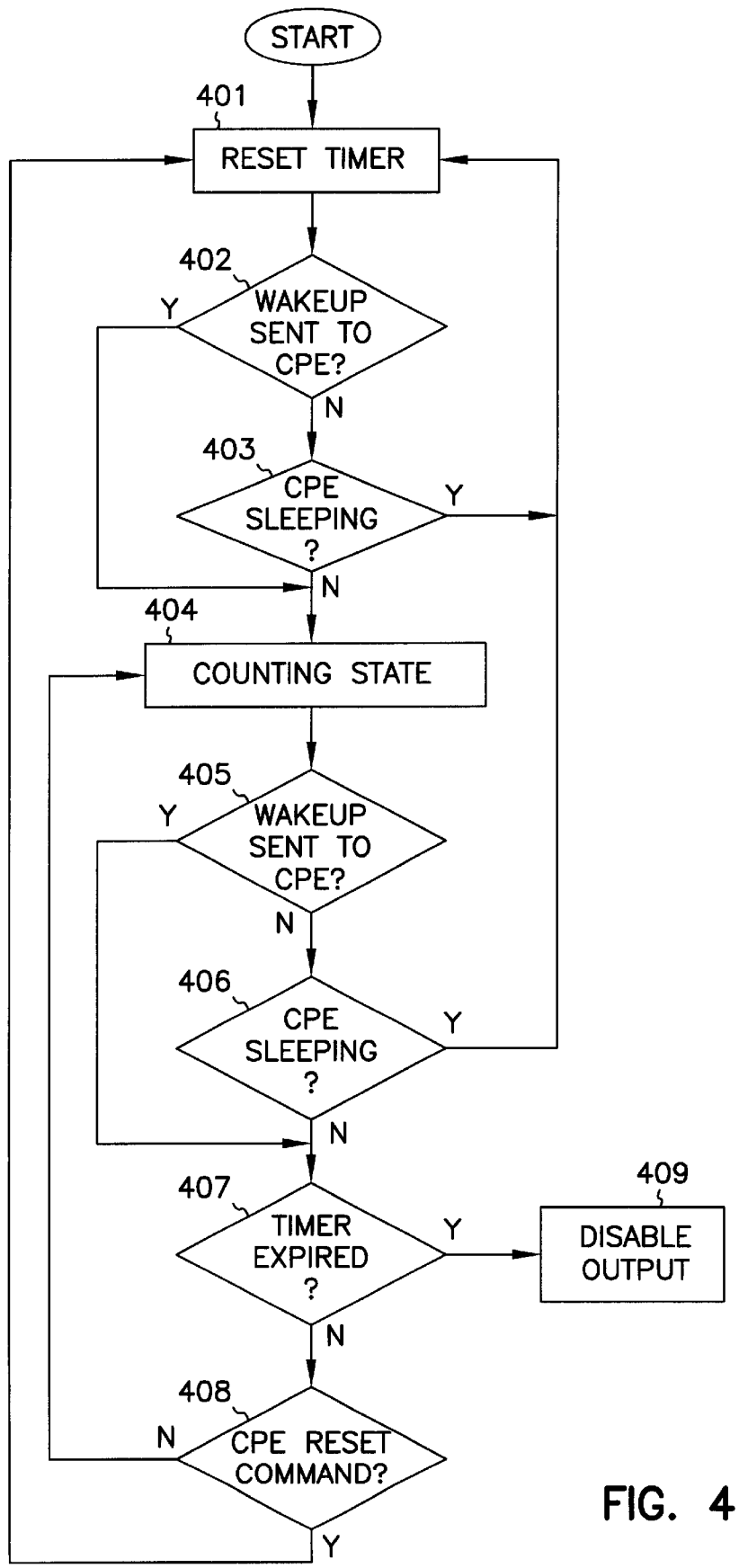
FIG. 4 is a flowchart representing a method for detecting malfunctions in a CPE device by a second device having a watchdog function having a timer in accordance with an embodiment of the present invention.

FIG. 4 is one embodiment of a method for detecting malfunctions in a CPE device by a second device having a watchdog function having a timer. The following do not necessarily have to be performed in order.

The timer is reset to an initial value 401. The initial value may be zero. A determination is made as to whether a wakeup has been sent to the CPE device by the second device 402. The wakeup can be a command or signal sent by the second device to the CPE device by a connection such as a serial link or a universal serial bus. If a wakeup has not been sent, a determination is made as to whether the CPE device is sleeping 403. If the CPE device is sleeping, the timer is reset. If the CPE device is not sleeping, the system enters the counting state at 404. If the wakeup has been sent to the CPE device, the system enters the counting state at 404.

In the counting state 404, the timer counts. The timer may count by a number of methods such as utilizing a clock, counting circuits or shifting registers. In other embodiments, the system is generally in the counting state and resets the timer upon events such as sleep or reset command.

A determination is made as to if a wakeup has been sent to the CPE device by the second device 405. The wakeup can be a command or signal sent by the second device to the CPE device by a connection such as a serial link or a universal serial bus. If a wakeup has not been send, a determination is made as to whether the CPE device is sleeping 406. If the CPE device is sleeping, the timer is reset. If the CPE device is not sleeping, a determination is made as to whether the timer has expired 407. The value of the timer is compared to a predetermined value. If the value of the timer is greater than the predetermined value, the timer has expired. If the timer has expired, the second device disables its output unit. If the timer has not expired, a determination is made as to whether a CPE reset has been sent by the CPE device 408. If the CPE reset has not been sent, the system returns to the counting state. If the CPE reset command has been sent, the timer is reset at 401.

By utilizing the various systems and methods disclosed, electronic devices can be used together better in power management environments thus allowing energy conservation. Furthermore, by allowing for more reliable operation of CPE controlled devices more electronic devices can be built as CPE devices instead of building more expensive stand alone units.

The invention has been described with reference to specific embodiments. Persons skilled in the art and having the benefit of this disclosure will recognize that these embodiments may be modified in a variety of ways, without deviating from the spirit of the invention. For example, while some of the disclosed embodiments refer to cable modems, the invention is applicable to other devices such as network devices. The specific examples are provided only to more clearly illustrate various features of the invention which is limited solely by the scope of the appended claims.

What is claimed is:

1. A system comprising:
   a first device operating in a power management environment and having a sleep status signal for indicating a sleep status; and
   a second device coupled to receive the sleep status signal from the first device, wherein the second device includes a watchdog timer circuit configured to be disabled in response to the sleep status signal, and wherein the first device is configured to not be responsive to a time-out of the watchdog timer circuit.

2. The system of claim 1 wherein the sleep status comprises a normal state and a sleep state.

3. The system of claim 2, wherein the second device is configured to check for malfunctions of the first device.

4. The system of claim 1, wherein the second device further comprises a wake signal for causing the first device to exit a sleep state.

5. A system comprising:
   a first device operating in a power managed environment and having a sleep status signal for indicating a sleep status, and having a second signal for periodically signaling that the first device is operating normally; and
   a second device coupled to the first device and controlled by the first device, the second device having a watchdog function responsive to the sleep status signal and the second signal, and having an output unit; wherein the first device is configured to not be responsive to the watchdog function.

6. The system of claim 5, wherein the watchdog function includes a watchdog timer.

7. The system of claim 6, wherein the timer counts until the timer reaches a predetermined value.

8. The system of claim 7, wherein the timer is reset periodically by the second signal of the first device.

9. The system of claim 5, wherein the output unit of the second device is disabled upon malfunctioning of the first device.

10. The system of claim 5, wherein the watchdog function is disabled upon the second device receiving a sleep status signal.

11. The system of claim 5, wherein the second device is a network adaptor.

12. The system of claim 5, wherein the second device is a modem.

13. A cable modem comprising:
    a watchdog timer coupled to receive a periodic reset signal and a sleep status signal from a device external to the cable modem; and
    an output unit configured to be disabled by the watchdog timer if the watchdog timer times out;
    wherein the watchdog timer is configured to stop if the sleep status signal indicates the device external to the cable modem is asleep.

14. The cable modem of claim 13 further comprising a serial interface to receive the periodic reset signal and the sleep status signal.

15. The cable modem of claim 14 wherein the serial interface comprises a universal serial bus (USB).

16. A modem comprising:
    a watchdog timer coupled to receive a periodic reset indication and a sleep status indication from a device external to the modem; and
    an output unit configured to be disabled by the watchdog timer if the watchdog timer times out;
    wherein the watchdog timer is configured to not disable the output unit if the sleep status indication indicates the device external to the modem is asleep.

17. The modem of claim 16 further comprising a serial interface to receive the periodic reset indication and the sleep status indication.

18. The modem of claim 17 wherein the serial interface comprises a universal serial bus (USB).

19. A cable modem comprising:
    a watchdog timer coupled to receive an indication of normal operation and an indication of a sleep status from a device external to the cable modem; and
    an output unit configured to be disabled by the watchdog timer if the watchdog timer does not receive the indication of normal operation from the device external to the cable modem;
    wherein the watchdog timer is configured to not disable the output unit if the indication of the sleep status indicates that the device external to the cable modem is asleep.

20. The cable modem of claim 19 further comprising a serial interface to receive the indication of normal operation and the indication of a sleep status.

21. The cable modem of claim 20 wherein the serial interface comprises a universal serial bus (USB).

* * * * *